United States Patent Office 3,363,646
Patented Jan. 16, 1968

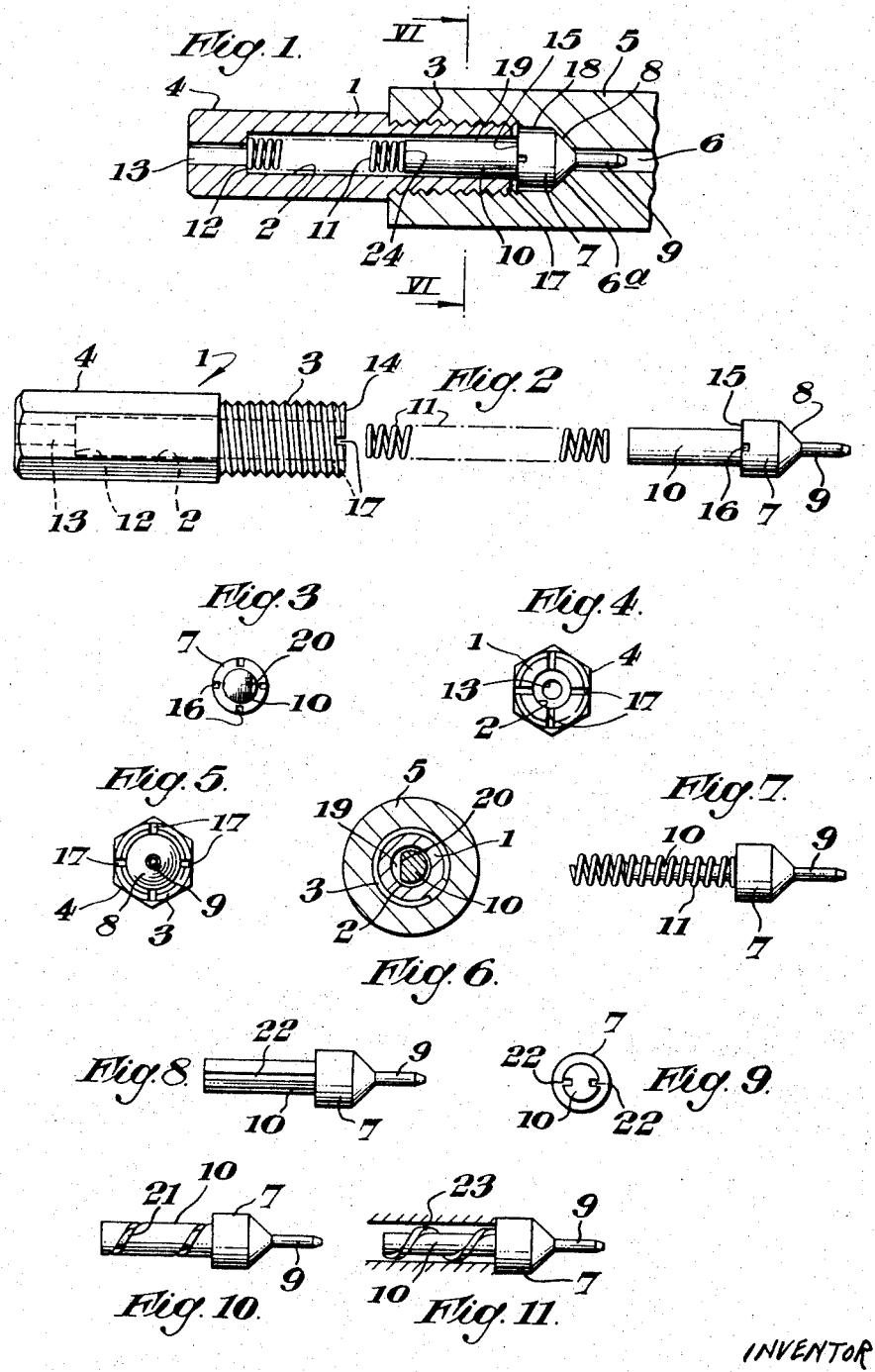

3,363,646
PRESSURE BLEEDER VALVES
Edward Harold William Foreman, 1 Heath Villas, The
Vale of Health, Hampstead, London, NW. 3, England
Filed Feb. 19, 1965, Ser. No. 433,862
Claims priority, application Great Britain, Aug. 10, 1964,
32,540/64
2 Claims. (Cl. 137—540)

ABSTRACT OF THE DISCLOSURE

Pressure bleeder device for direct application to the bleeder orifice of a hydraulic brake cylinder at a vehicle wheel, in which the orifice is controlled by an axially guided spring loaded valve mounted externally on one end of a one-piece tubular body which has a fluid escape channel therethrough controlled by the valve and which can be adjustably secured in the hydraulic cylinder containing the orifice to enable the valve to be locked non-resiliently closed in the orifice or, according to the adjustment, to float under the control of the spring loading so that it can open to bleed hydraulic fluid while the pressure of the fluid exceeds the spring loading of the valve.

---

This invention relates to a pressure bleeder valve device, and provides a simple and efficient valve device for sealed coupling, e.g., screw thread engagement with apparatus having a fluid—liquid or gas—system which includes a bleeder orifice. One particular application of the invention is to the hydraulic braking system of a motor vehicle.

Previous bleeder devices or check valves have required a valve within a valve or a multi-part body and have not provided, in combination, the facility of a positive lock closure for the valve or a resilient closure according to the axial setting of a one-piece body directly mounted in the housing which contains the bleeder orifice which the valve is intended to control.

The principal object of the invention is to provide an improved construction which has the minimum of parts (in practice three), is easy to manufacture, is robust, and is unlikely to get out of order during use, being particularly suitable to the dimensional requirements for the brake bleeding orifices at the respective wheels of a vehicle, and having the dual facilities aforesaid.

According to the invention there is provided a bleeder device for a hydraulic cylinder having a bleeder orifice within an internally screw threaded housing, said device comprising, in combination, a tubular one-piece body with a fluid relief channel extending therethrough from end to end, a valve member having an orifice controlling a valve head disposed externally adjacent one end of the said body, and having a stem axially guided in said channel, complementary abutment surfaces on said body end and said valve head respectively, with fluid relief passages in communication with said channel, a loading spring in said channel pressing on the valve member to separate said abutment surfaces, and an external screw thread on the said body for screw adjustment in said orifice housing to provide for locking the abutment surfaces together with the valve in closed position or to enable the abutment surfaces to be held separated with the valve under the control of the spring loading.

When the screw thread is tightened up, the closure head is maintained non-resiliently in orifice closing position by the thrust generated by the interengaging screw threads causing the abutment surfaces to be clamped tightly together. The spring then has no control over the valve member. When, however, the body is screwed back into fluid bleeding position, the closure head can open under the pressure of the fluid but now comes under the control of the spring loading the valve member, the abutment surfaces serving to limit the opening movement, and the spring serving to bring the closure head back to orifice-closing position when the fluid pressure in the system drops below the spring-loading pressure. The fluid relief surfaces between the abutment surfaces and on the valve member stem serve to allow fluid to escape through the body to give the bleeding facility while the valve member is under spring control when the orifice is opened by the closure head.

The device, according to the invention, avoids the need for bleeder passages being formed through the closure head and the stem, and thus in conjunction wtih the single part body provides for a cheaper and simpler construction of bleeder device than hitherto.

The loading spring for the valve member may be a coiled spring which embraces the stem and is housed with the stem in the through passageway of the body, said passageway having a shoulder at the end opposite the abutment surface end of the body to act as an abutment or anchor for the spring. This spring-embracing arrangement may of itself serve to provide sufficient space between the stem and internal body wall to give a fluid flow escape passage or channel, but preferably the stem and/or the body wall is modified to provide the required fluid escape channel. Thus the stem or internal body wall may have one or more longitudinal slots or flats extending from end to end, or the stem or body interior may have a helical groove or a long open helix projection, e.g., a screw thread extending about its length. Alternatively the loading spring may be attached or butt on to the end of the valve member stem.

The fluid relief surfaces between the abutment surfaces may consist of one or more cross-wire or circumferentially extending slots on the underside of the head and/or in the end surface of the body. These slots may, for example, be of V cross-section.

In order that the invention may be readily undestood and carried into effect various embodiments and alternatives thereof will now be described with reference to the accompanying drawings in which:

FIGURE 1 shows a longitudinal section of the bleeder device according to the invention applied to the bleeder orifice of a vehicle braking system, FIGURE 2 is an exploded view of the device per se, FIGURE 3 is an end view of the valve in the device showing pressure release slots in the underside of the head on the abutment surface thereof, FIGURE 4 is an end view of the body showing pressure release slots on the abutment surface thereof, FIGURE 5 is an end view of the device from the valve end showing the screw thread on the body for fixing the device in the bleeder orifice housing and also showing the hexagon drive or nut on the body by which the body can be turned for adjusting the closure of the valve and separating or closing together the abutment surfaces, FIGURE 6 is a cross-section on the line VI—VI of FIGURE 1 showing one form of valve stem which has at least one relief on one side of the stem and where the bore or passageway through the body is of circular cross-section, FIGURE 7 is a detail showing one form of valve in which the spring for loading the same is housed over the stem, FIGURES 8 and 9 show longitudinal and end views respectively in detail of a valve stem with pressure release slots therein instead of one or more flats as in FIGURE 6, FIGURE 10 is a detail of the valve stem showing an alternative form in which a helical pressure release slot instead of a flat or a longitudinal slot is formed thereon and FIGURE 11 is a detail of another form of valve in which the stem has a helical projection to form a pressure relief channel within the bore of the body, and this may be used in conjunction with slots in the body wall or otherwise as the case may be.

With particular reference to FIGURES 1 and 2 it will be seen that the body 1 is a tubular member having an inner bore 2, an external screw thread 3 at one end, and hexagonal nut portion 4 at the opposite end which enables the body to be screwed into correspondingly threaded housing in the braking cylinder 5 of a vehicle having a bleeder orifice 6 which is adapted to be closed when the body is screwed in tight by means of a valve head 7 with conical seating surface 8 for seating in a corresponding orifice seating 6a and a tapered projection 9 which is a sliding fit in the orifice 6 and serves to centralise the valve relative to the seating 8 when the valve is open and as it is screwed into the closed position. At the opposite end the valve has a stem 10 of reduced cross-section to the head which stem has a loose sliding fit in the bore 2 of the body.

The stem is acted upon by a spring 11 which takes abutment against a shoulder 12 at the outer end of the body adjacent to a fluid outlet 13 of reduced cross-section to that of the bore 2. The spring serves to resiliently maintain the valve in closed position when the body is unscrewed for the purposes of bleeding. Bleeding pressure of the fluid will open the valve against the spring to allow the fluid to pass the head and through the bore of the body and out at the outlet 13.

For the purpose of maintaining the valve in closed position non-resiliently when the body is screwed tightly into the housing 5, the inner end of the body adjacent to the valve head terminates in an annular flat abutment surface 14 which co-operates with an annular flat shoulder surface 15 formed at the junction of the head with the stem 10. Either or both these abutment surfaces may have pressure relief slots cut in them to allow fluid to pass between the head and the body and into the through passageway of the latter when the valve is under the spring control. Thus as shown in FIGURE 3 a plurality of such slots 16 may be formed in the head abutment surface 15 or a plurality of radial slots 17 e.g. four such slots equiangularly spaced may be cut radial across the abutment surface 14 at the end of the body. The diameter of the valve head 7 is less than the overall diameter of the body screw thread 3 to provide the necessary pressure fluid relief space 18 about the valve head 7 when the bleeder orifice 6 is opened to leave the valve under the spring control.

As will be observed the valve stem 10 is virtually guided axially by the surrounding bore 2 of the body and for the purpose of giving fluid passage when the valve is opened, the stem and/or the guide portion of the bore are provided with fluid relief surfaces which provide a fluid channel 19 about the stem. Thus conveniently the valve stem which is of generally cylindrical shape may have at least one flat surface 20 which extends from under the head 7 to the opposite end of the stem as will be clear from FIGURE 6. One such surface with a cylindrical bore will generally be sufficient but several may be provided and instead of the stem the bore itself may be similarly flattened. Alternatively or additionally the stem or the body guide portion of the bore 2 may have a helical slot 21 (FIGURE 10) or a longitudinal slot 22 (FIGURES 8 and 9), or instead of slots there may be projections 23 such as in FIGURE 11 helical or straight as may be most convenient to make.

In the form shown in FIGURES 1 and 2 the valve stem is foreshortened in relation to the bore 2 to provide a space for the spring 11 which thus takes its abutment between the body shoulder 12 and the end 24 of the valve stem. Alternatively as shown in FIGURE 7 the control spring 11a may embrace the stem of the valve 10, the valve stem then passing through the bore 2 to terminate nearer to the shoulder 12.

It is believed that the operation of the device will be self-evident from FIGURES 1 and 2 and in particular with reference to FIGURE 1 it will be seen that when the body 1 is screwed up tight into the brake housing 5 the two abutment surfaces 14 and 15 of body and valve respectively are clamped together with the valve head seating tightly and in closed position in the seating 6a of the orifice 6. Thus the thrust generated by the interengaging screw threads maintains the valve closed and the spring 11 has no control over the valve member. When the body is screwed back into a fluid bleeding position the abutment surfaces 14 and 15 will be maintained closed only by the fluid pressure and they serve to limit the opening movement of the valve under the action of said pressure. Thus fluid passes through the orifice 6 and past the relief space 18 and from thence through the pressure relief slots between head and body into the fluid relief channel 19 and from thence out at the exit 13. When the fluid pressure in the system drops below the loading pressure of the spring 11 the said spring will cause the valve to again close the orifice 6.

It will be appreciated that any suitable form of valve seating 8 may be provided on the head 7, for example, instead of being conical the seating may be part spherical or dome shape, and the orifice seating surface 6a will be shaped to correspond.

I claim:

1. Pressure bleeder valve device for use with apparatus having a fluid system which includes a first body member having a bleeder orifice, said device comprising a one-piece tubular body having a through passageway for fluid with a fluid outlet of reduced diameter at one end, said passageway having a guide portion for a valve stem, a valve member having a stem slidable in said guide portion of the passageway and a head portion in an enlarged bore in said first body member co-operating with the opposite end of said tubular body, said head portion having an orifice closure surface with a centraliser for engaging said orifice to close the same, abutment surfaces between the head of said valve and the adjacent end of said tubular body, means within the tubular body including a spring co-acting with said valve stem to separate the abutment surfaces resiliently, said abutment surfaces and said portions having fluid relief surfaces provided thereon to form a fluid flow channel connecting the head with the outlet in said tubular body and means on said tubular body for adjustably locking the abutment surfaces together and to the said apparatus when the head is closing the orifice, the head of said valve being of reduced diameter relative to the enlarged bore of the first body member to provide a fluid escape area around the same in communication with said fluid flow channel.

2. A pressure bleeder device for a braking cylinder for a vehicle wheel having a fluid channel terminating in a bleeder orifice and a screw threaded housing having an internal bore between the screw thread and the orifice, of greater diameter than the orifice, to provide a fluid escape passage, said device comprising a tubular one-piece body having an external screw thread at one end to fit the corresponding thread of the housing and an external surface for turning said body at the opposite end, an internal shoulder at said opposite end in the passageway of the body to form a fluid outlet and a spring abutment, a valve member comprising an elongated guide stem axially slidable in said tubular body and terminating in a cylindrical head of reduced diameter relative to said internal passage of said housing, said head having a seating surface for fitting into the orifice to open and close the same, annular abutment surface at the stem end of said head co-operating with an annular abutment surface at the adjacent end of said body, fluid release slots in one at least of said abutment surfaces, said slots leading to a fluid release channel along said stem formed by co-operating surfaces on said stem and the body, and a spring engaging said shoulder and said valve member to press the same axially into engagement with said orifice and to separate the abutment surfaces when the body is fitted to the housing.

References Cited

UNITED STATES PATENTS

| | | | |
|---|---|---|---|
| 168,192 | 9/1875 | Smith | 137—533.25 X |
| 1,917,941 | 7/1933 | Hehr | 138—42 |
| 2,771,093 | 11/1956 | Wilson | 188—152.14 X |
| 2,892,614 | 6/1959 | Majneri | 188—152.14 X |
| 2,960,998 | 11/1960 | Sinker | 137—542 |

FOREIGN PATENTS 437,161  10/1935  Great Britain.

WILLIAM F. O'DEA, *Primary Examiner.*

D. H. LAMBERT, *Assistant Examiner.*